Figure 1:
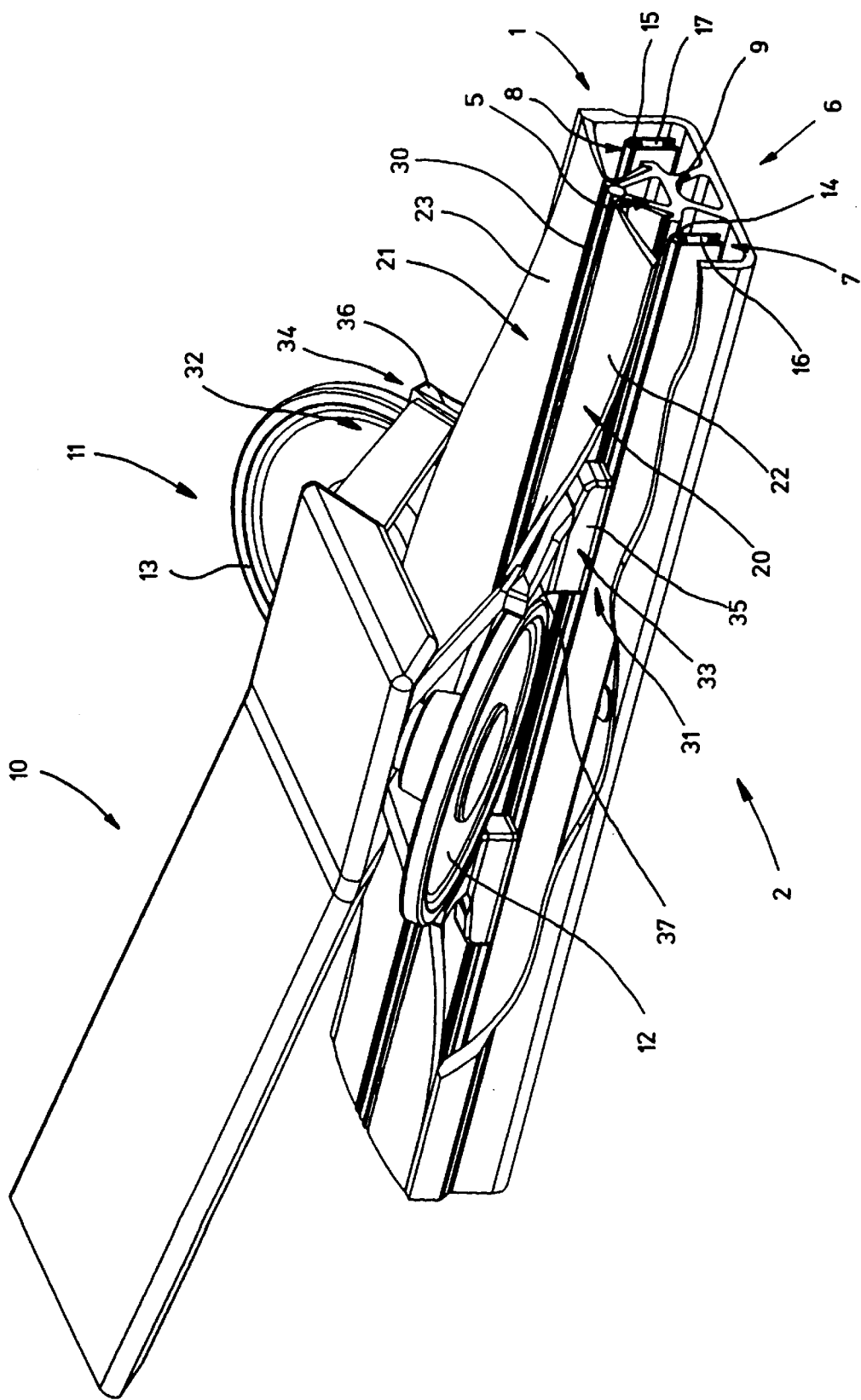

United States Patent [19]
Andre

[11] Patent Number: 5,960,717
[45] Date of Patent: Oct. 5, 1999

[54] ELECTRICAL POWER SUPPLY AND GUIDANCE ASSEMBLY ALONG A GROUND RAIL FOR A WHEELED VEHICLE

[75] Inventor: Jean-Luc Andre, Obernai, France

[73] Assignee: Lohr Industrie, Hagenbieten, France

[21] Appl. No.: 08/981,402

[22] PCT Filed: Jun. 19, 1996

[86] PCT No.: PCT/FR96/00942

§ 371 Date: Dec. 18, 1997

§ 102(e) Date: Dec. 18, 1997

[87] PCT Pub. No.: WO97/00787

PCT Pub. Date: Jan. 9, 1997

[30] Foreign Application Priority Data

Jun. 23, 1995 [FR] France ................................. 95 07742

[51] Int. Cl.[6] .................... B61F 13/00; B60M 1/34
[52] U.S. Cl. ........................ 104/139; 191/25; 191/6
[58] Field of Search ........................ 104/139, 146, 104/194, 244; 191/23 R, 25, 28, 6, 14; 105/72.2

[56] References Cited

U.S. PATENT DOCUMENTS

| | | |
|---|---|---|
| 519,328 | 5/1894 | Graham et al. .................. 191/23 R |
| 3,859,925 | 1/1975 | Hartz ..................................... 104/139 |
| 4,067,257 | 1/1978 | Pentith ..................................... 191/25 |
| 4,238,010 | 12/1980 | Hidaka . |
| 4,239,094 | 12/1980 | Uchiyama et al. . |
| 4,245,727 | 1/1981 | Pentith ..................................... 191/25 |
| 5,277,285 | 1/1994 | Musachio ................................. 191/6 |
| 5,704,295 | 1/1998 | Lohr ...................................... 104/244 |

*Primary Examiner*—S. Joseph Morano
*Attorney, Agent, or Firm*—Davis and Bujold

[57] ABSTRACT

An electrical power supply and guidance assembly for a wheeled vehicle, consisting of a raisable and pivotable guide member supporting at least one pair of guide wheels which together define a V shape and engage the central web of the rail, the rail being a guiding profile section used as a track. Covering portions forming a linear closure protect the space containing the conductors. Opening mechanisms enable the contact portion(s) to pass through and along the closure to collect the supply current and automatically close the closure. The assembly is particularly suitable for electrically powered urban wheeled transport.

18 Claims, 13 Drawing Sheets

ELECTRICAL POWER SUPPLY AND GUIDANCE ASSEMBLY ALONG A GROUND RAIL FOR A WHEELED VEHICLE

The present invention relates to an electrical power supply and guidance assembly along a ground rail for a wheeled vehicle, especially an urban passenger vehicle.

Such guidance assemblies for controlling the drive train are already known, for example, on cars with independent wheels, such as a public transportation vehicles.

Electrically propelled road vehicles are conventionally supplied with electricity through overhead conductor cables or contact wires above the tracks.

For esthetic reasons, it has become desirable to eliminate the electrified aerial lines, replacing them with a combined guidance assembly and electrical supply unit for vehicles such as trolley buses using a conductive track such as a rail, either attached to the ground or submerged below ground level.

Nevertheless, this solution can pose obvious safety problems. It is imperative that passengers and all persons be protected from any accidental or intentional contact with the electrical supply conductor or conductors.

A system is already known for guiding a road vehicle along a ground rail using a lifting device with a V-shaped wheel arrangement. This guidance system must fulfill several conditions relating to its operation, the environment, and passengers.

First, the pivoting guide device should be permanently lowered to the ground, forcing the guide wheels or wheels to contact the track, and thus reducing the risk of derailment. This force or pre-charge is conventionally accomplished using a hydraulic cylinder or a spring. The same result is obtained if the guide wheels are locked onto the rail.

Next, as in the situation proposed by the invention, i.e., adding an electrical power source at ground level or, more specifically, through the guide member, there should be a cover or a protective element which the contact pieces must penetrate to block access to the conductor or conductors. This protection is mandated not only by exterior factors such as exposure to weather and pollution, but it is also a deterrent to vandals and others who might come into accidental contact with the conductive elements and effectively expose themselves to the risk of electrocution.

Finally, in order to reduce noise and eliminate wear on the guide wheels, the guide wheels should be of fairly large diameter, even though this seems incompatible, a priori, with vehicles designed low to the ground for easy passenger access.

Protection from exterior elements can be improved by connecting electrically independent, insulated segments of the conductive element to the active terminal of the electrical source as the vehicle advances on its course.

The present invention proposes a method of effectively overcoming this difficulty and others by proposing a power supply and guidance assembly means for a road vehicle which is propelled by electricity or mixed fuels, through a ground rail, consisting of a device installed on the chassis of the vehicle which supports two inclined guide wheels, converging into a "V" at the base, and which have a specialized shape adapted to electrically contact one or the other conductors connected to one of the phases or one of the poles of the source of electrical current propelling the road vehicle.

More specifically, according to one of its variations, the power supply-guidance assembly has on its lower surface an electricity collector with a friction member at its terminal extremity that contacts the conductive bars and conducts electricity from one or the other electrical phases or poles to propel the vehicle electrically.

According to an essential feature of the present invention, all the electrically conductive bars which supply current are located on the lower portion below the level of the core of the rail incorporated into the roadway, with the rail preferably being protected by one or two covers which form a linear closure. The closure elements open locally when the guide head passes through and then close automatically. In this way, all risk of accidental electrocution is eliminated.

According to another advantage of the invention, electricity is supplied through a fragmented electrified segment on at least one of the conductors, which is electrified as the vehicle approaches it and engages upon arrival of the vehicle.

The electrical supply-guidance assembly according to the invention may be used with all types of current. A first phase or pole of the electrical supply is connected to the guide wheel track, while the others are connected to the conductive bars or each conductive element inside the rail along the length of the rail.

The goal of the present invention is to group on one functional guidance assembly unit, incorporated within a raisable device, all the various desirable features and means for simultaneously furnishing electrical current through the ground rail guidance assembly.

Generally speaking, a threefold goal of the invention is to simultaneously provide a guidance assembly, an electrical power supply, and passenger protection from electrical current.

Figure 2:
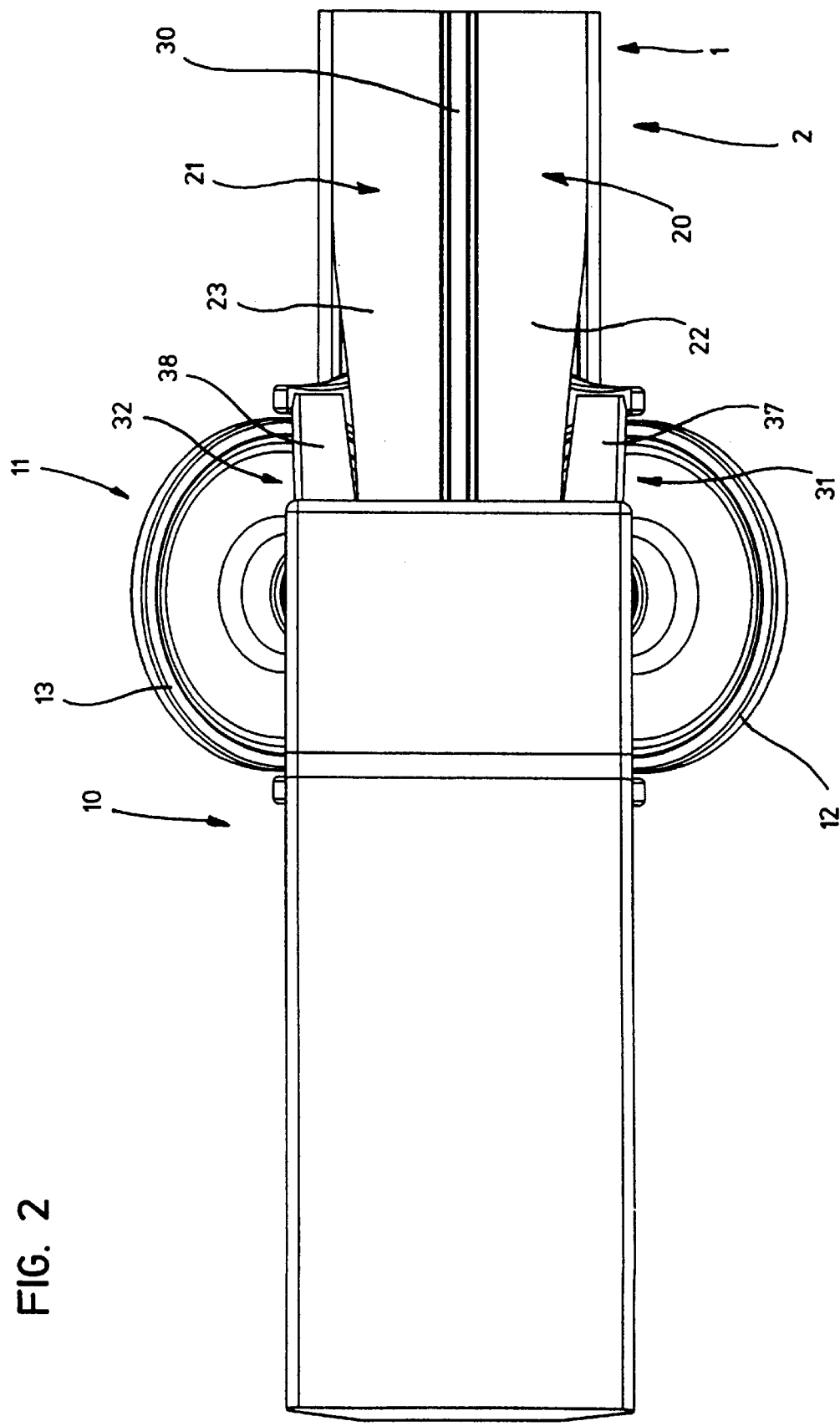
Figure 3:
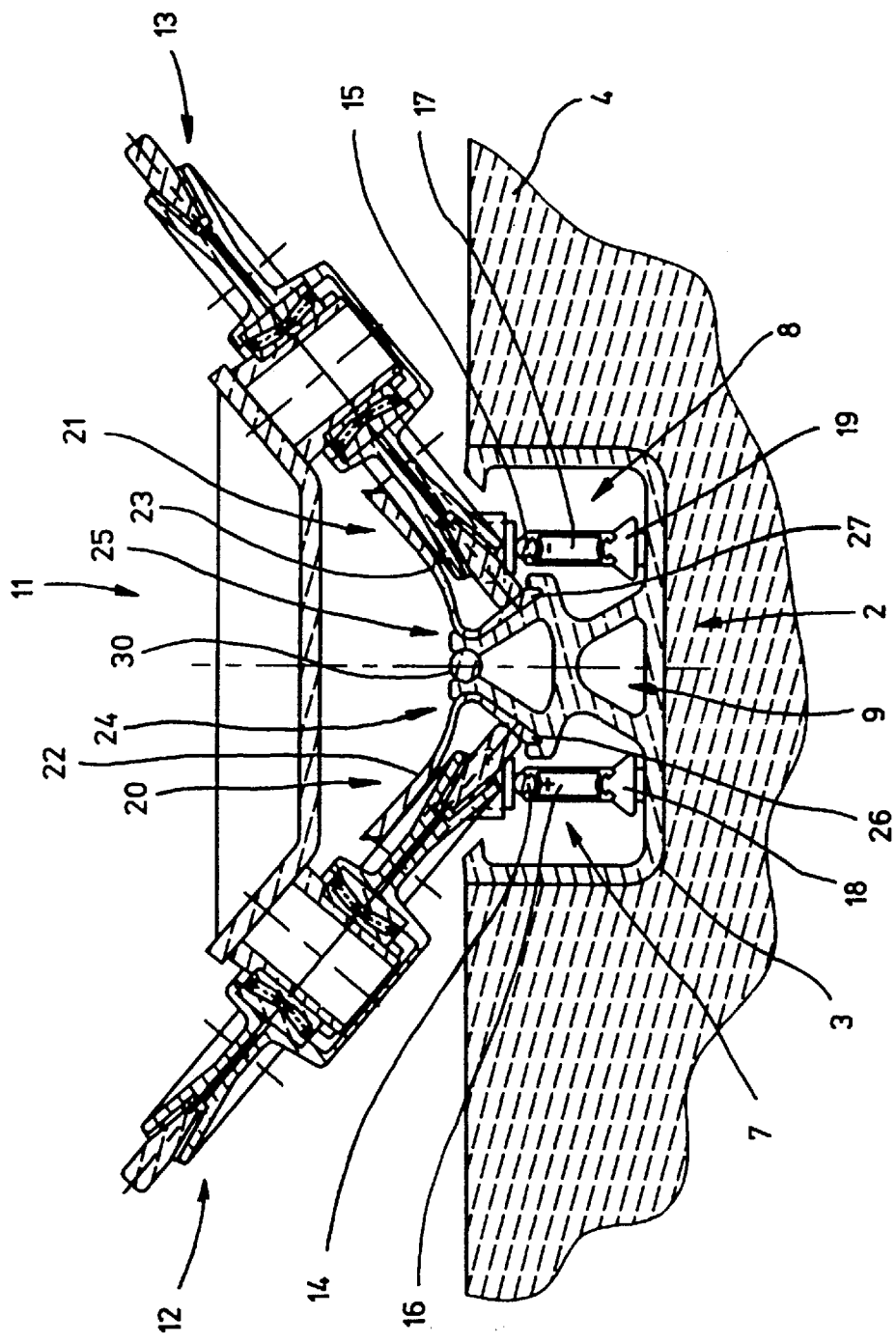
Figure 4:
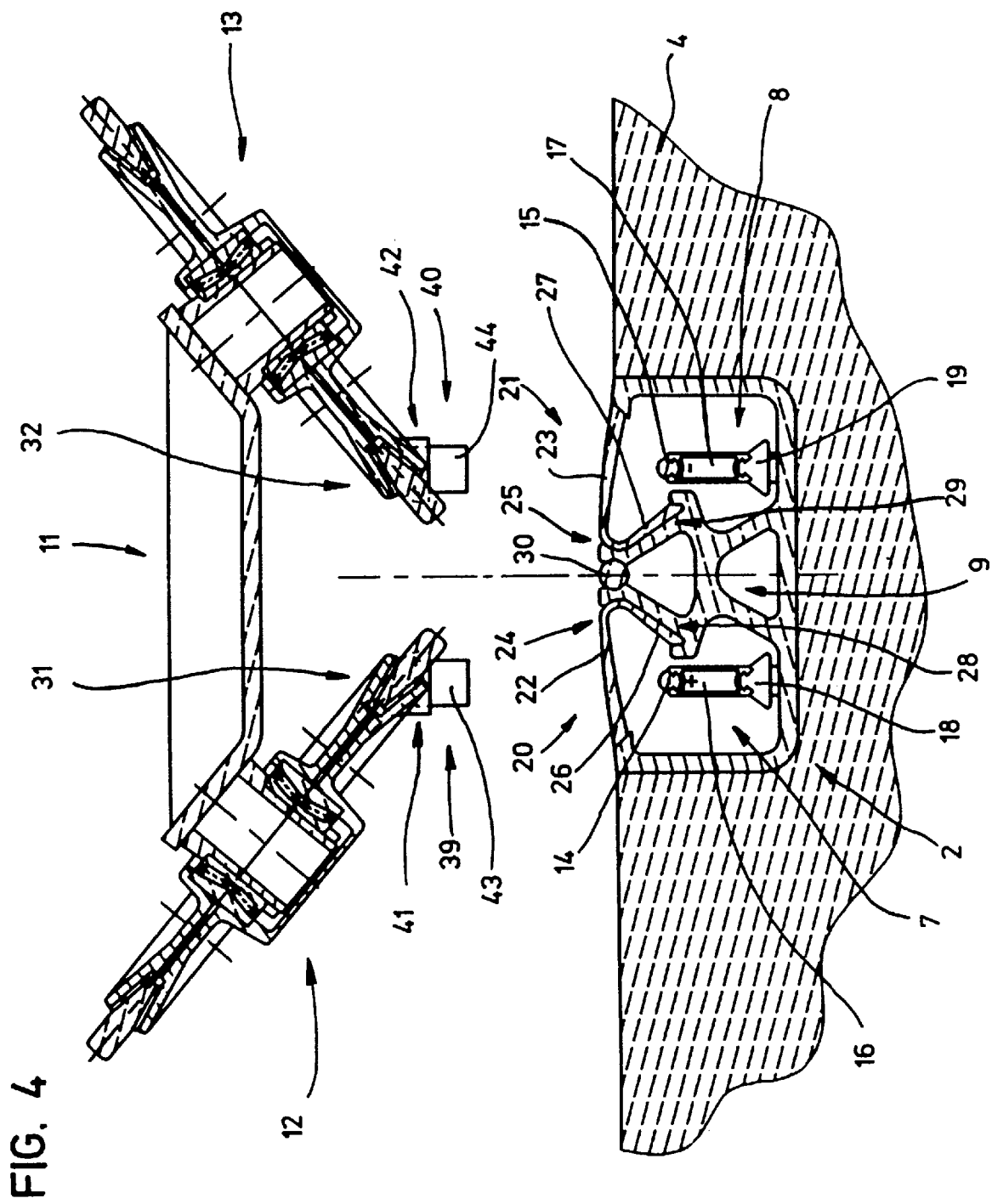
Figure 5:
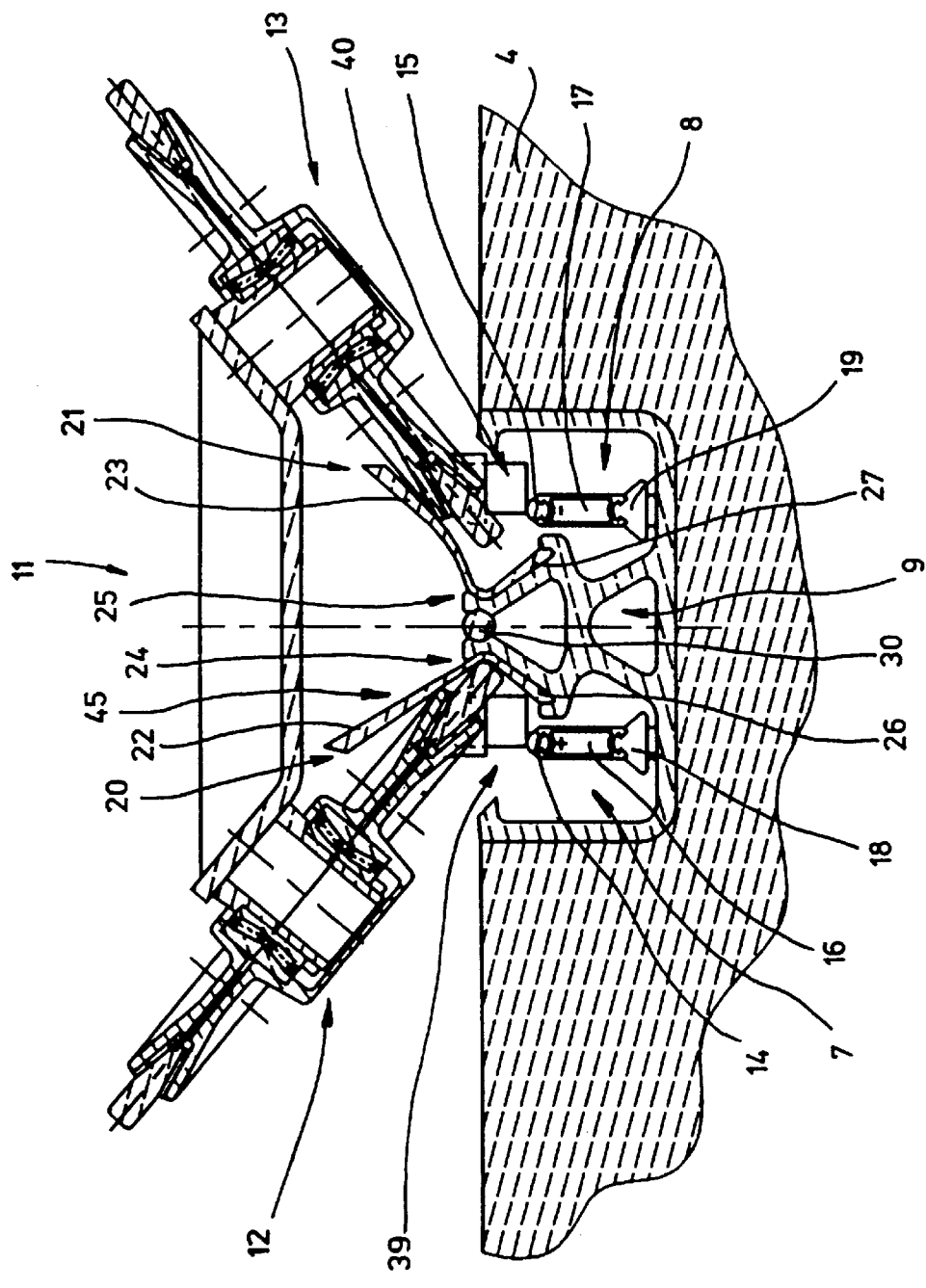
Figure 6:
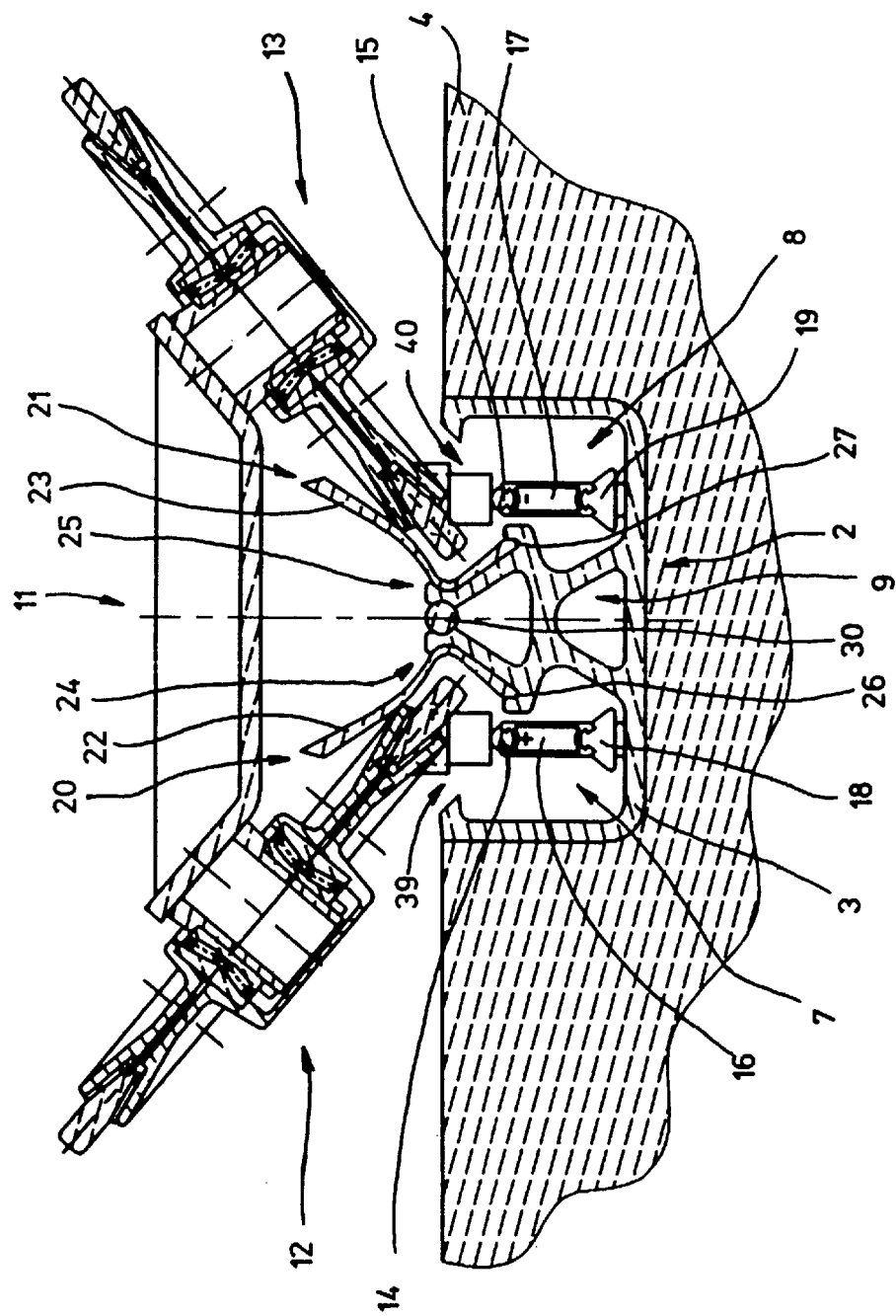
Figure 7:
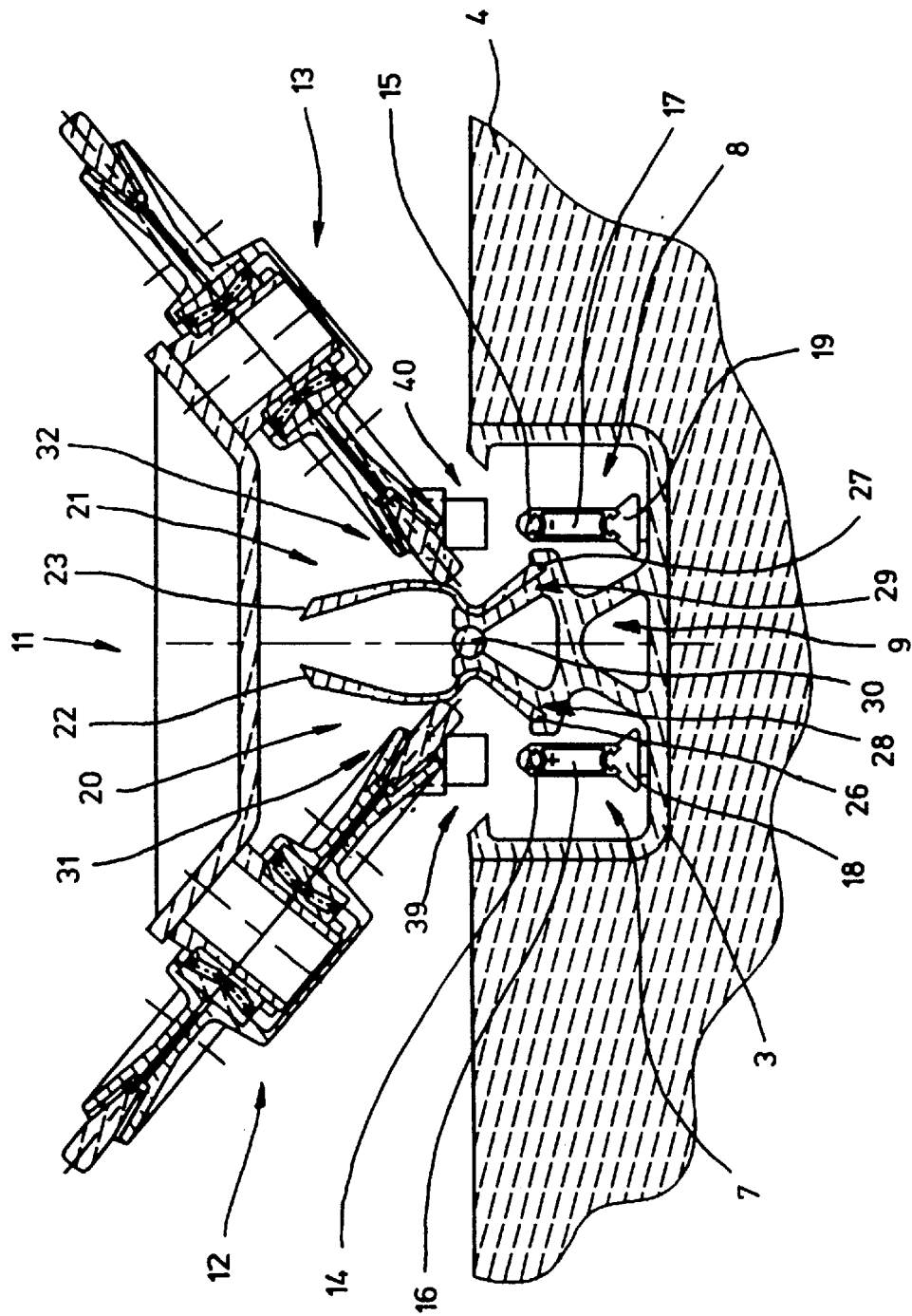
Figure 8:
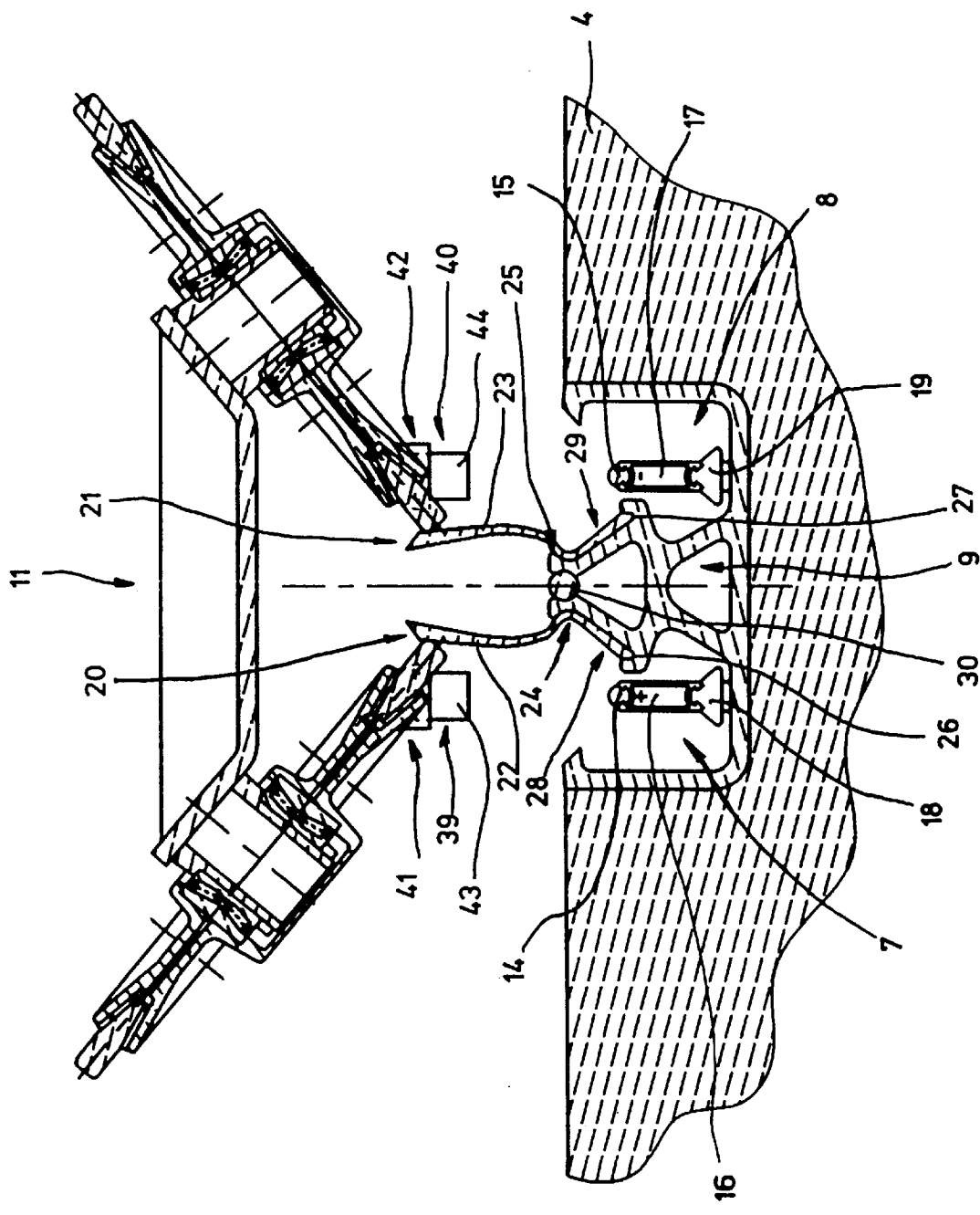
Figure 9:
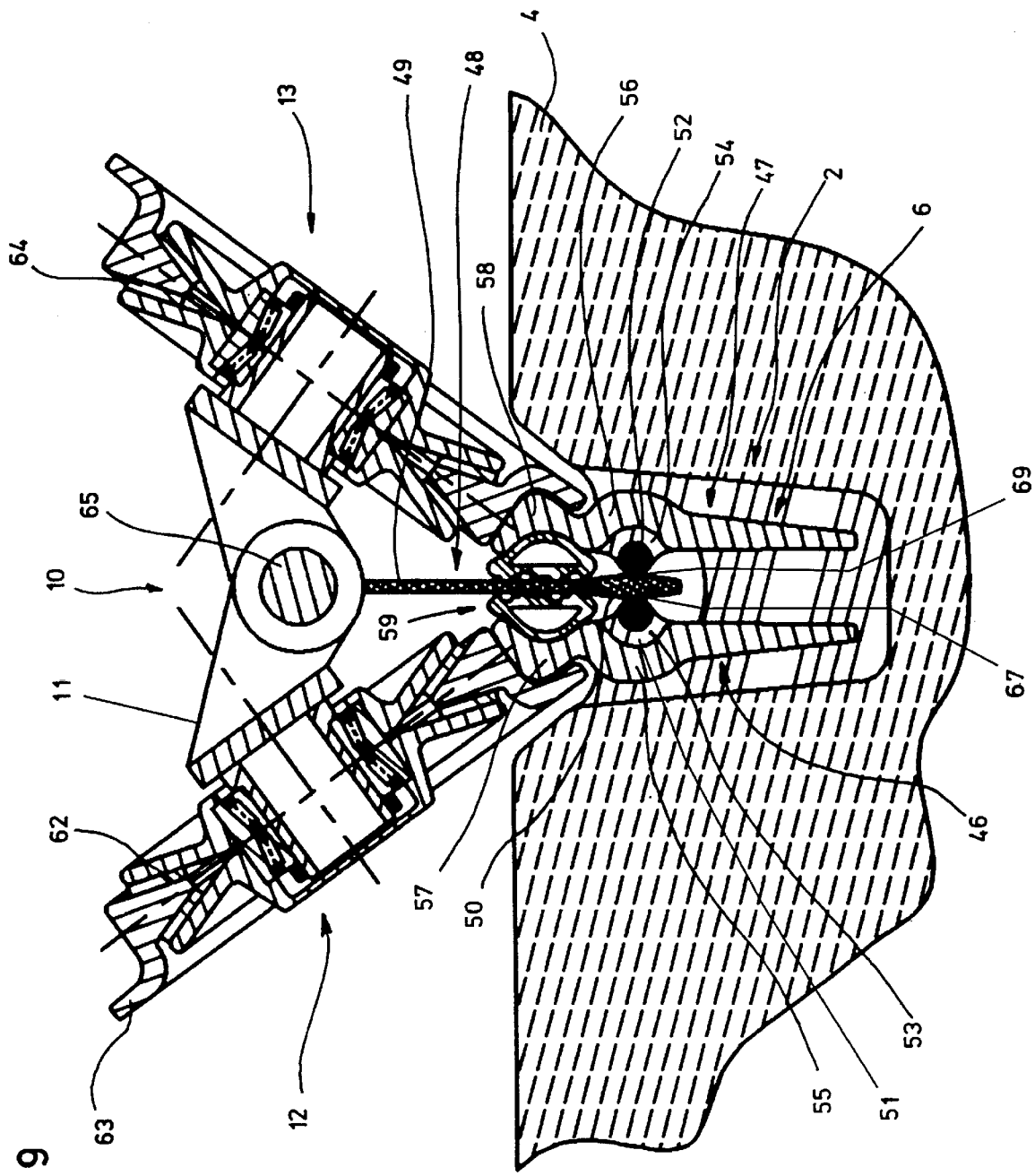
Figure 10:
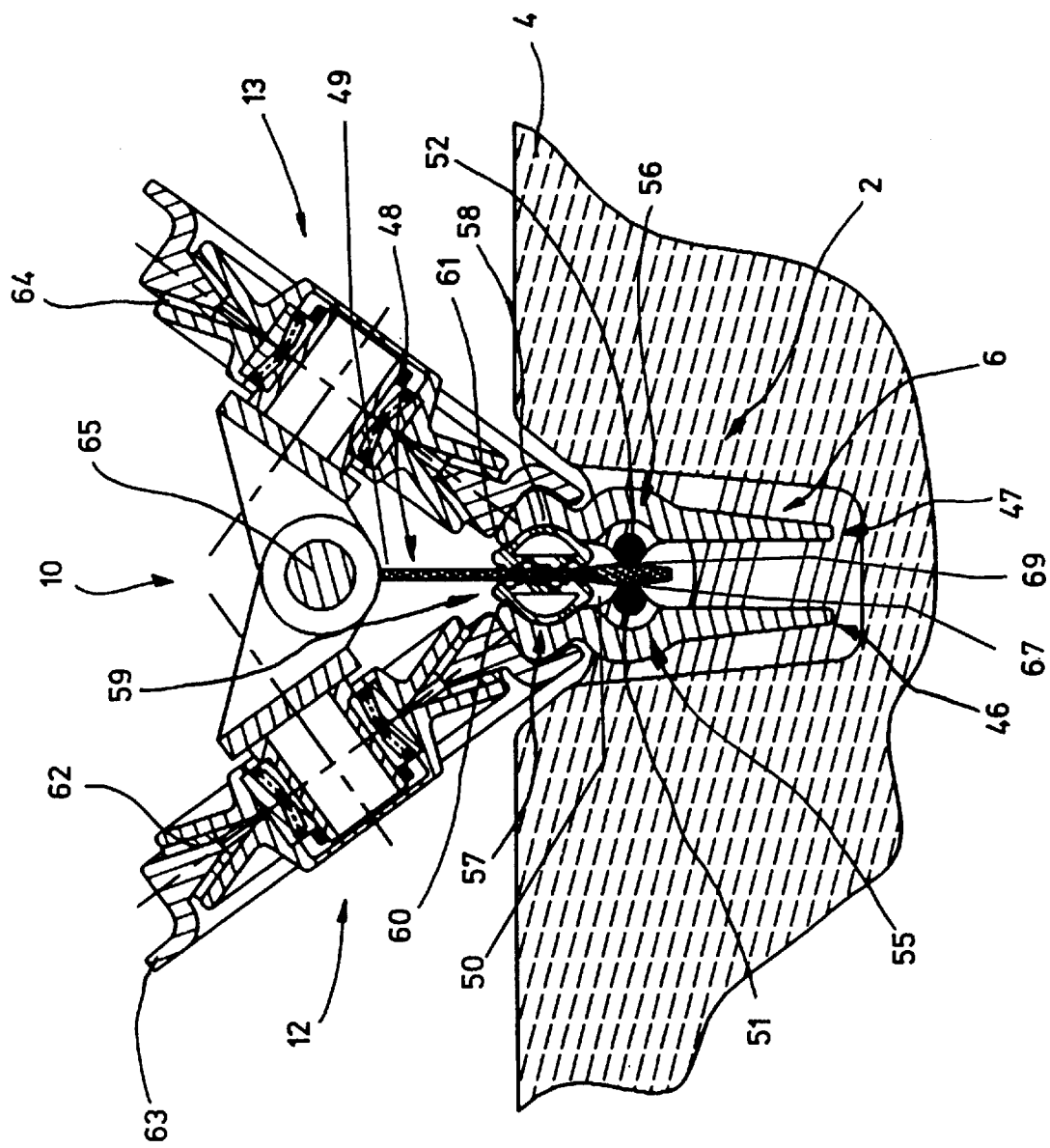
Figure 11:
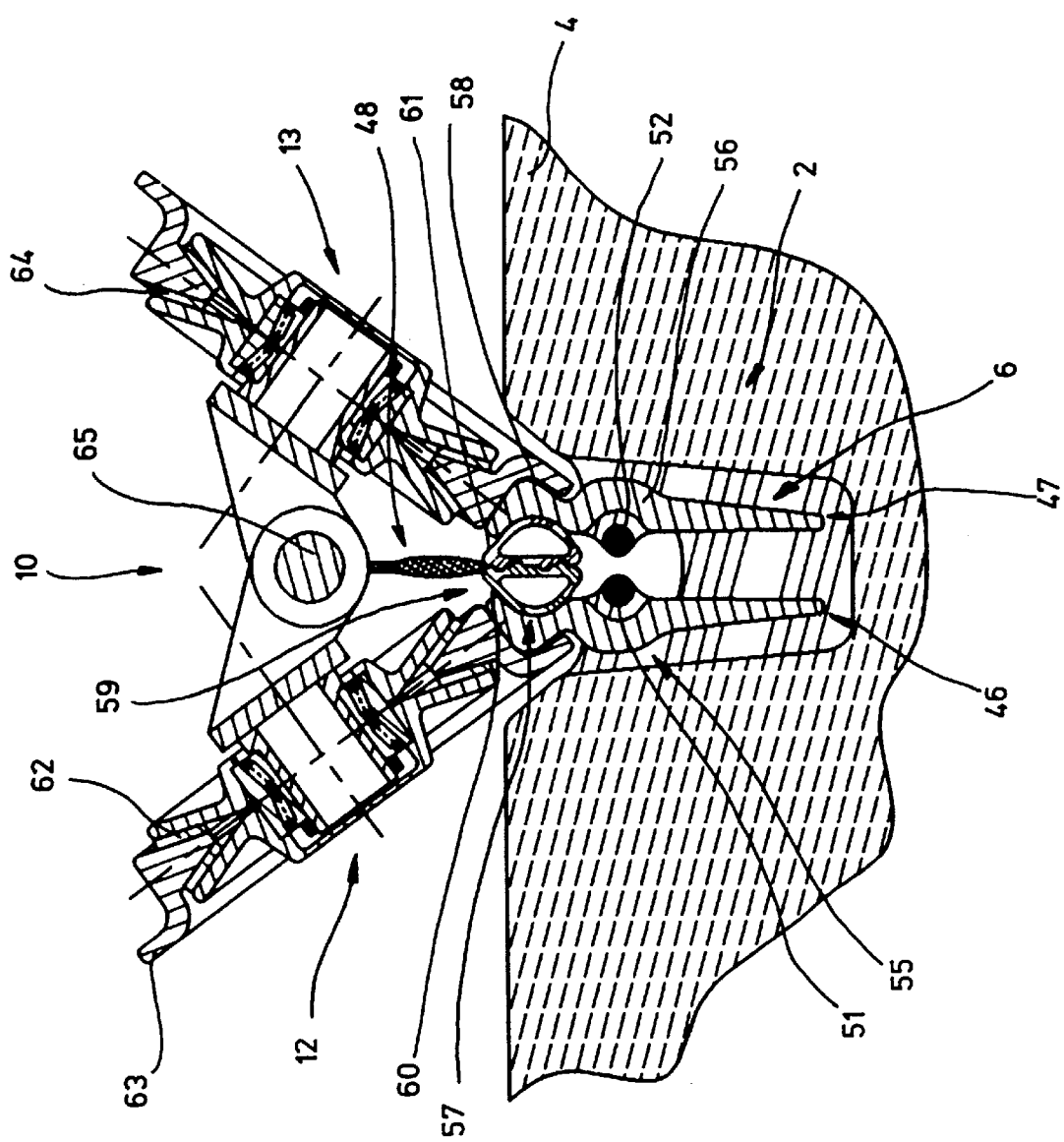
Figure 12:
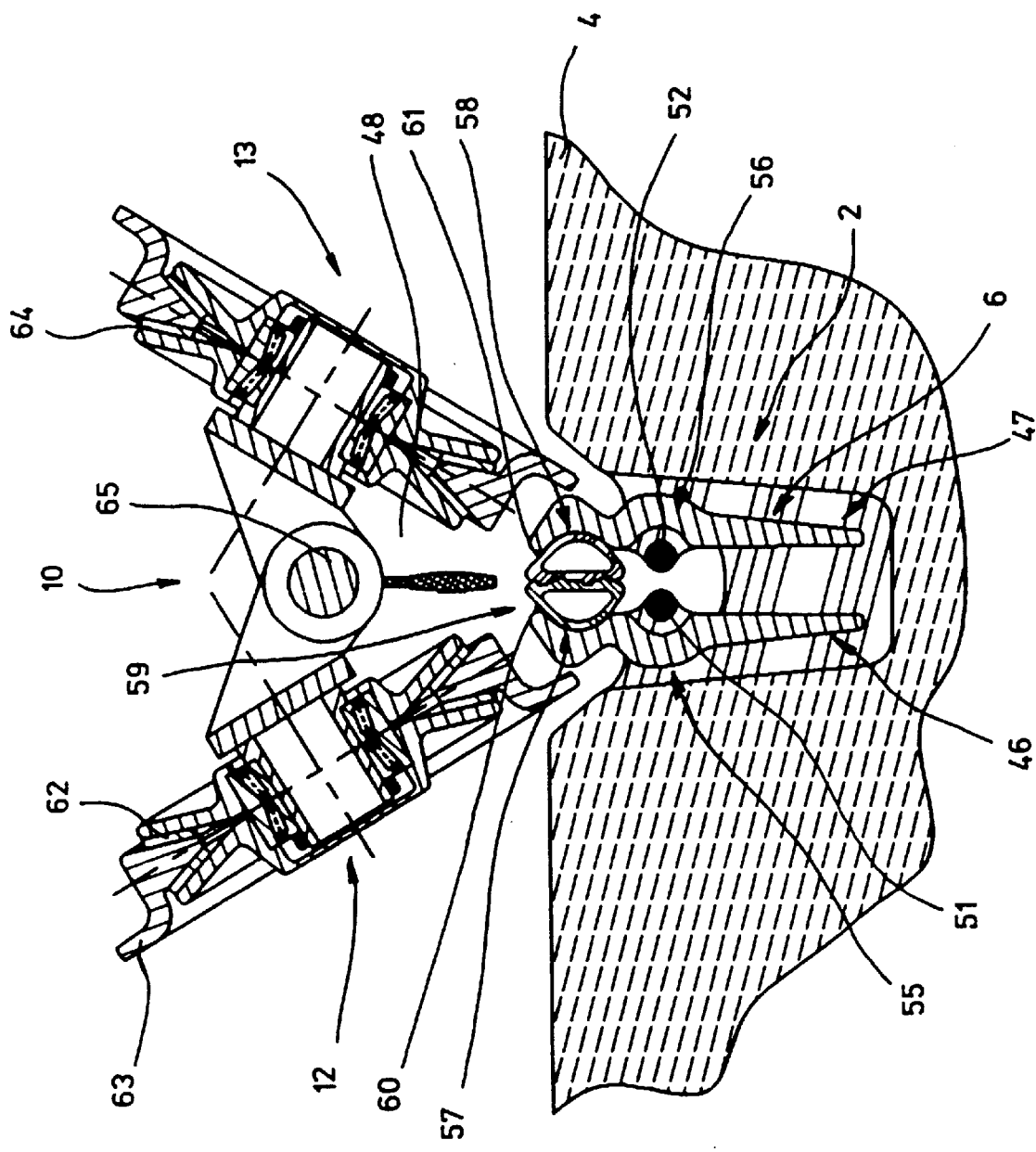
Figure 13:
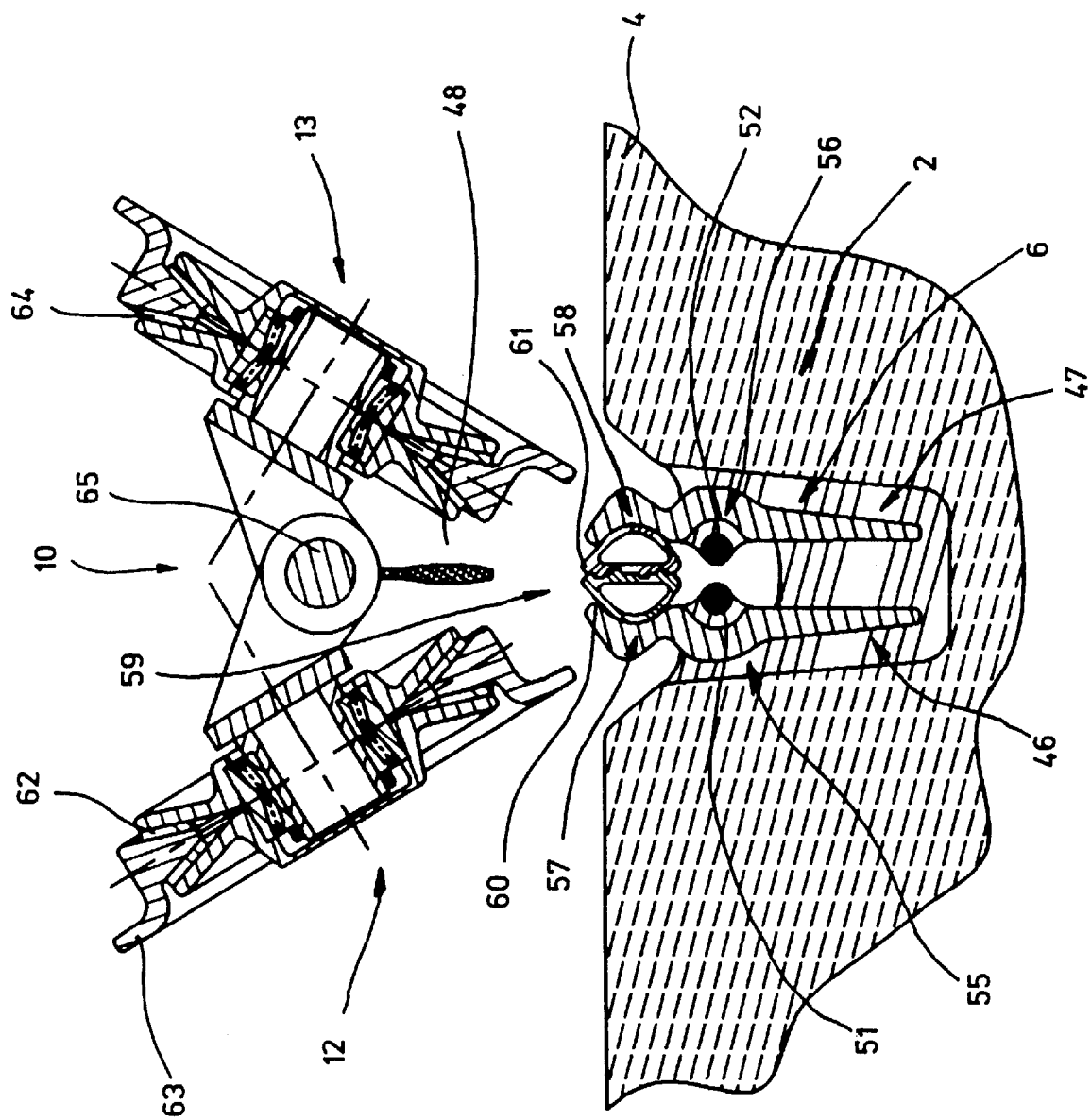

Other characteristics and features of the invention will be apparent from the following description, given by way of example, and the accompanying drawings, wherein:

FIG. 1: a general perspective view with a cut-away view of the guide wheels and the contact-holding, lifting support of the first mode of execution;

FIG. 2: a plan view of the first mode of execution;

FIGS. 3 and 4: transverse cross-sections, respectively, showing the operative mode and the wheels when raised;

FIG. 5: a schematic cross-section showing the positions of the guide wheels when turning;

FIGS. 6, 7 and 8: schematic transverse cross-sections showing how the lips are raised in three positions, and the two extreme positions during the vertical extraction of the wheels;

FIG. 9: a transverse cross-section of a variation of a cover element opening from the center;

FIGS. 10 through 13: transverse schematic cross-sections showing how the guide head is raised and how the electrical contact element leaves the linear closure;

The guidance assembly and electrical supply unit of the invention may take two different forms, which are shown by FIGS. 1 through 8 and 9 through 13, respectively.

It utilizes some type of carrier for the guide wheels, for example, a chariot, and it is attached to a unit on which it pivots freely.

Body 1 of a guidance and electrical supply rail 2 with base wall 3 is attached to the ground 4, or preferably partially submerged in the ground, so that its upper surface is generally level with the path of the vehicle.

The body of the rail is generally U-shaped with an upper surface 5 that is open toward the top, with a central guiding core 6 dividing the interior space into two tubular compartments 7 and 8.

Central core 6 is a guiding element 9 which forms a pathway for the guide wheels, while body 1 of ground rail 2 provides protection and mechanical rigidity for the rail unit.

There is a carrier of some type to guide the guide wheels, for example, a chariot, which, in the example shown, consists of a pivot arm 10 with a guide head 11 at its front extremity, equipped with roller means in the form of a pair of guide wheels 12 and 13 arranged in a broad "V" at a constant angle.

This angle should be as wide as possible. It is approximately 90° and may approach 120°, thereby lowering wheel height and allowing large diameter guide wheels to be used, which decreases wear, rotation speed, and noise.

The guidance device 10 shown consist of arms, but it may have other general shapes, such as, for example, a pivoting, movable support.

According to the first variation, the two tubular compartments 7 and 8 inside rail 2 are occupied by supply conductors, each in the form of a linear element 14 and 15, such as a cable, a bar, or the like, housed within a maintenance support 16 and 17, each attached to an electrical insulator 18 and 19 perpendicular to the base wall 3 of rail 2.

There is at least one conductive linear element 14 or 15 for each tubular compartment 7 or 8 and thus for each pole or phase of the current source.

The open upper face of body 1 of ground guidance rail 2 is covered by two protective pieces 20 and 21, with the upper portion of each one forming an adjacent lip 22 and 23 which bends out from median line so that each one covers one-half of the open upper surface of the rail. These lips bend upward around a crosspiece 24 or 25 running along the upper median portion of the rail core.

Each protective element 20, 21 has an angled transverse section. It consists of lip 22 or 23, forming the upper covering flap, and a lower flap 26 or 27 forming a pathway. Said lower flap engages within the central core. The flaps are interconnected by crosspieces 24 or 25.

Central guide core 6 of rail 2 is formed of a symmetrical central guiding element 9 with an inclined groove-housing 28 or 29 on either side which accommodates lower flap 26 or 27 of each covering element 20 or 21.

Groove-housings 28 or 29 are separated at the top of central core 6 by a rectilinear blocking vertical element.

Vertical element 30 grips the protective elements and maintains them safely in position.

Because core 6 is made of flexible material, vertical 30 element separates each lower flap 26 and 27 of covering elements 20 or 21 and maintains them in the housing so that they can only be extracted after vertical element 30 is removed.

In the variation shown, each guide wheel 12 or 13 is part of a right and a left contact-holding and raising unit, 31, 32, respectively, each formed of two identical portions, for example, 33 and 34, repeated symmetrically along the median vertical transverse and longitudinal planes, respectively.

These holding elements 31 and 32 are used to locally and continuously raise each protective lip 22 and 23 so they will disengage to allow for passage of each guide wheel 12 or 13 and collection of the electrical current to supply the motors.

In general, they are each composed of the following elements:

For each unit, a boot like structure 35 or 36, possibly inclined, pointed in shape, is attached to the front and connected to the mechanical block of guide head 11 by a diagonal connecting bracket 37 or 38. The rear portion of the boot serves as a support for a contact-holding support 39 or 40, within which there is attached an electrical contact element 43, 44, elastically attached so as to slide downward, usually made of carbon, which rubs against conductor 14 or 15 like a shoe to capture electrical current.

In the version shown, boot 35 or 36, integrating contact-holding support 39, 40, is duplicated at the rear of the guide wheel. This symmetrical arrangement allows a second contact element to be provided at the rear of each guide wheel for improved, high intensity electrical contact and, if desired, for displacement in the other direction.

The design with front and rear contacts also makes it possible to have a dual phase electrical supply with conductors properly insulated from each other, one at the front and the other at the rear.

The external surface of lower flap 26, 27 covers groove-housing 28 or 29, while its interior surface provides a pathway for the corresponding guide wheel 12, 13 and, because it rolls on a more narrow surface, it can be laterally displaced on this path in relation to the oblique surface.

As shown in FIG. 5, this feature is used on turns. Centrifugal force raises the guide wheel along the internal surface of the lower flap used for a path as far as a stop at the level of the bracket angle, that is, the area of crosspiece 24 or 25, and causes the corresponding flap to lift slightly.

The large flaps or lips 22 or 23 of each cover piece are flexible enough to assume a semi-vertical position under the effect of the force required to lift the guide wheels, allowing the guide wheels to be extracted from the flaps without changing their inclination.

This flexibility, associated with weight, also generates a downward elastic recall force constraining guide head 11 permanently against rail 2, thus eliminating any need for pre-charging it with a cylinder or a spring.

FIGS. 5 through 8 demonstrate the role of the bracket crosspiece, or rather the right-angled shape of the crosspiece zone assumed by the extremities of the two upper flaps 22 or 23 of the protective element partially engaged in the groove-housing.

This crosspiece zone is blocked and wedged against the groove-housing.

It fulfills a fourfold function.

First, it forms a stopping edge 45 for the side of the guide wheel which is kept elevated by centrifugal force during turns.

It also forms a zone that is resistant to the considerable vertical force required to raise the device.

In addition, it maintains protection in place, since it is still engaged while the arm moves upward vertically, and the lips curve inward almost vertically to release the guide wheels (FIG. 8).

Finally, because of its general flexibility and its more restricted working zone with additional flexibility, it provides a downward elastic recall force, thereby eliminating the need for pre-charging the arm with a cylinder or a spring.

This recall effect prevents the arm from lifting accidentally during operation.

The invention provides improved electrical safety by splitting at least one electrical conductor, preferably the one connected to the positive pole, into electrically independent segments which are electrified by the approach of the vehicle and disconnected from the electrical supply as the vehicle distances itself from the segments. Thus, a fractional portion of the conductor is live only while the vehicle is moving.

This particular feature reduces the risk of electrical shock to passengers.

The second variation shown in FIGS. 9 through 13 utilizes some type of guide wheel carrier, for example, a chariot. In the form shown, it consists of a lifting pivot arm, also referenced as number 10, preferably installed on the terminal portion of the front of the vehicle chassis and controlling the drive train of the vehicle as its angular position varies.

Pivot arm 10 has two inclined guide wheels forming a "V", such as wheels 12 and 13, which roll along the central guide core 6 of ground rail 2. This arrangement forms a double pathway supplying electrical propulsion to the vehicle, preferably in the form of two guide members 46 and 47 each parallel to each wheel. Guide members 46 and 47 are housed within the interior of the rail body and immobilized within it by an electrically insulating material, properly grounded. A trench or a gutter in the ground accommodates the interior of rail body 1 with mechanical protective elements and means for attachment to central core 6.

The pivoting guide arm has at least one current collector 48 in the form of a conductive vertical blade 49 extending into a contact shoe 50 which tightly contacts two opposing conductive bars or linear elements 51 and 52 located in the interior space defined by the two guide members of central core 6.

The conductors are partially embedded in an electrically insulating layer 53 or 54 which maintains them in position and forms an elastic electrical contact that also absorbs wear when they are in contact.

As indicated, head 11 of pivoting guide arm 10 according to the invention is generally shaped like a "V" open at the top and holding one of the guide wheels 12 or 13 on each of its two branches, each of which has a groove adapted to form a mechanical or an electrical moving contact with the corresponding lateral shoulders of guide members 46 and 47.

It is preferable but not necessary for the current collector on the guide member to consist of one or two separated friction elements disposed on the front and the rear of each guide wheel. The electricity always returns.

Collector 48, located on the sub-surface of the pivot arm, extends vertically downward so that its contact shoe 50 engages tightly in contact between conductive bars 51 and 52 after they have been separated. The bars are connected to the same single electrical supply pole which is the source of electrical current propelling the vehicle.

For this purpose, each opposing lateral surface of the guide profiles forms a median longitudinal groove 55, 56 which receives one of the conductive bars 51 or 52. The electrical insulation layer 53 or 54, simultaneously maintaining the mechanical connection of conductive bars 51 or 52, is added to the base of the groove, between each of the bars and the half of the guide member which supports it.

An upper longitudinal groove 57, 58 is formed in each upper portion of the opposing lateral surfaces of the guide elements, below the surface which receives the conductive bar.

The piece forming the collector may be fixed, in which case it lifts up along with the guide head, or it may be movable, for example, it may tip, in which case it pivots at the top while the arm is raised or after it is raised. Thus, it may be rendered operative or inoperative either in conjunction with the arm or independently of it.

The upper grooves have an anti-penetration protection consisting of a linear closure 59 with lateral elements consisting of two identical hollow profiles 60 and 61, made of flexible material, contained in the upper grooves. These profiles have a crescent shaped transverse section. Their front surfaces are opposite each other. Their dimensions are such that when at rest, their opposing surfaces are joined. Since the profile elements are flexible and hollow, these opposing surfaces can flatten inwardly to form a separation large enough to accommodate the conductive blade, thus forming an actual slide which seals tightly, but also making the interior space in the two half-rail portions containing the conductive bars inaccessible to a passenger or any other person.

As indicated, the hollow elements are flexible enough to allow them to separate from each other transversely and accommodate the conductive blade of the collector as it moves forward while the vehicle is operating, and they continuously open locally along the slide, triggered by the passage of the collector, closing after it passes through.

Preferably, the opposing surfaces of the hollow elements have complementary geometric shapes, or they may consist of baffles, to improve the seal of the interior space between the rails when the collector is not inside it and to make access to the conductors difficult or impossible.

The roller means of the guidance-power supply head according to the invention consists of a pair of identically shaped inclined guide wheels 12 and 13 forming a "V", each having an axis of rotation integral with the pivot arm to which the guide wheel body is rotatably attached using a bearing. On the peripheral groove 62 of the guide wheel body there is a crown gear 63 with enough mechanical strength to effectively resist the mechanical effects of motion, particularly wear. Crown gears 63 are attached within the groove, and may be attached using supplemental electrically insulating pieces 64, such as elastomeric pieces, providing both insulation and a buffer for operational play, as well as absorbing any lateral shifting on curves. These pieces, which provide electrical insulation and elastic recall force, also absorb mechanical vibrations.

It should be noted here that there may be multiple conductors and that other current phases could be captured at various levels.

According to one variation, the guide wheels are movable and can be separated on their longitudinal pivot axle 65 for release from the guide rail; they are then gripped lightly to re-engage them in position for movement along the guide rails.

As in the preceding application, electricity is supplied to the guide rails using segments of predetermined length which are electrically independent; the maximum length of these segments is approximately the same as the vehicle length, so there is electrical discontinuity on the active conductor or conductors but not on the return. This arrangement means that the electrical supply contacts continuously contact a charged segment, while the nearby segments are not charged. The segments are charged as the vehicle advances, that is, the arrival of the vehicle at a segment triggers the electrical supply and conversely, the supply is cut after the rear portion of the vehicle has passed.

I claim:

1. An electrical power supply and guidance unit for guiding and supplying electrical power to a wheeled transportation vehicle, the wheeled transportation vehicle having a pivoting support including a guide head equipped with at least one pair of guide wheels being arranged in a downward pointing V configuration; the electrical power supply and guidance unit comprising:

a guide rail being supported by a desired ground surface, the guide rail having a central guiding core forming a pathway for cooperating with the guide wheels of the pivoting support; the central guiding core protruding from a base of the guide rail and, during guidance of the wheeled transportation vehicle, the central guiding core being located between and engaged with the guide wheels of the pivoting support, the guide rail also having electrical supply conductors for supplying electrical power to the wheeled transportation vehicle, and said central guiding core further supporting a pair of protective elements being arranged to protect the electrical supply conductors while allowing the guide head to temporarily displace the adjacent protective elements to facilitate contact between the guide head and the guide rail.

2. The electrical power supply and guidance unit according to claim 1, wherein the protective elements comprise two cover elements made from a flexible material and supported by the central guiding core.

3. The electrical power supply and guidance unit according to claim 1, wherein each protective element comprises an angled member with a lower flap and an upper flap joined together by a connecting crosspiece.

4. The electrical power supply and guidance unit according to claim 1, wherein the central guiding core is formed from two symmetrical pieces which comprise guide elements for the inclined guide wheels, and an upper portion of the guide elements supports a linear slide closure means which comprises two opposing hollow, crescent-shaped pieces with abutting surfaces which, when separated from one another, form an opening for a conductive blade carried by the guide head.

5. The electrical power supply and guidance unit according to claim 4, wherein an electrically conductive contact is established between at least one conductive bar carried by the guide element and the conductive blade of the guide head.

6. The electrical power supply and guidance unit according to claim 5, wherein the electrically conductive contact is established via an electrically conductive contact element carried by the guide head with the supply conductors of the guide elements.

7. The electrical power supply and guidance unit according to claim 6, wherein the contact element is a blade-shaped contact element.

8. The electrical power supply and guidance unit according to claim 4, wherein the guide elements have two supply conductors, each supply conductor is flexibly supported by an insulation layer, and the two supply conductors define a space therebetween that expands when a contact element, wider than the defined space, is introduced.

9. The electrical power supply and guidance unit according to claim 4, wherein the two pieces of the linear slide closure means have a complementary shape.

10. The electrical power supply and guidance unit according to claim 1, wherein the electrical power supply and guidance unit is formed into an elongate route having a plurality of electrically independent segments, and each electrically independent segment is electrified prior to the guide head arriving at the independent segment and disconnected following departure of the guide head departure from the electrically independent segment.

11. The electrical power supply and guidance unit according to claim 1, wherein an angle formed between the two inclined guide wheels of the guide head is greater than 90°.

12. The electrical power supply and guidance unit according to claim 1, wherein an angle formed between the two inclined guide wheels of the guide head is greater than 120°.

13. An electrical power supply and guidance unit in combination with a guide head being pivotably supported by a wheeled transportation vehicle for guiding and supplying electrical power to the wheeled transportation vehicle, the guide head being equipped with at least one pair of guide wheels arranged in a downward pointing V configuration; and the electrical power supply and guidance unit comprising:

a guide rail being supported by a desired ground surface, the guide rail having a central guiding core forming a pathway for cooperating with the guide wheels of the guide head; the guide rail also having electrical supply conductors for supplying electrical power to the wheeled transportation vehicle, said central guiding core further supporting a pair of protective elements being arranged to protect the electrical supply conductors while allowing the guide head to temporarily displace the protective elements and facilitate contact between the guide head and the guide rail; the protective elements comprise two cover elements made from a flexible material and being supported by the central guiding core; and the guide head has, on at least one side of each inclined guide wheel, a contact-holding support and means for displacing a lip of each protective element.

14. The combination according to claim 13, wherein a single connection to the guide head supports both the contact-holding support and the means for displacing the lip of the protective element.

15. The combination according to claim 14, wherein the central guiding core has two inclined groove-housings, and each inclined groove-housing has a shoulder which engages with a lower flap of one of the protective elements, and an outwardly facing surface of each of the lower flaps serves as a path along which one of the guide wheel rolls.

16. The combination according to claim 15, wherein the shoulder which serves as a stop for the protective element and the crosspiece contacts the shoulder.

17. The combination according to claim 13, wherein the guide head has, at a front portion and at a rear portion of each inclined guide wheel, the contact-holding support and the means for displacing the lip of the protective element.

18. The combination according to claim 13, wherein each contact-holding support and means for displacing the lip of the protective elements comprises at least one of a front and a rear pointed boot which sufficiently displaces the upper flap of the protective element away from the electrical supply conductors to allow contact of the guide wheels with the central guiding core.

* * * * *